United States Patent [19]

Ogata

[11] Patent Number: 4,923,839
[45] Date of Patent: May 8, 1990

[54] LOW TEMPERATURE SYNTHESIS OF CONDENSATION POLYMERS

[75] Inventor: Naoya Ogata, Tokyo, Japan

[73] Assignee: The Goodyear Tire & Rubber Company, Akron, Ohio

[21] Appl. No.: 344,160

[22] Filed: Apr. 27, 1989

Related U.S. Application Data

[62] Division of Ser. No. 180,924, Apr. 11, 1988, Pat. No. 4,843,053, which is a division of Ser. No. 11,464, Feb. 5, 1987, Pat. No. 4,804,730.

[51] Int. Cl.$^5$ .............................................. B01J 31/06
[52] U.S. Cl. ..................................................... 502/159
[58] Field of Search ........................................ 502/159

[56] References Cited

U.S. PATENT DOCUMENTS

| | | | |
|---|---|---|---|
| 4,077,944 | 3/1978 | Weinberg et al. | 260/75 R |
| 4,143,057 | 3/1979 | Weinberg et al. | 260/429 R |
| 4,156,072 | 5/1979 | Weinberg et al. | 528/279 |
| 4,258,206 | 3/1981 | Pittman et al. | 502/159 X |
| 4,266,085 | 5/1981 | Kim et al. | 502/159 X |
| 4,526,884 | 7/1985 | Tsou et al. | 502/159 X |
| 4,668,762 | 5/1987 | Ogata | 528/286 |

OTHER PUBLICATIONS

Shinichiro Kitayama et al., "Synthesis of Aromatic Polyesters by Direct Polycondensation with Triphenylphosphine Dichloride", 1984.

*Primary Examiner*—Patrick P. Garvin
*Attorney, Agent, or Firm*—Alvin T. Rockhill

[57] ABSTRACT

Condensation polymers of high molecular weight, such as polyesters, polyureas, and polyamides, are usually prepared at temperatures of 200° C. or greater. However, by utilizing the catalyst systems of the present invention, condensation polymers can be synthesized at much lower temperatures. The polycondensation catalyst systems of the present invention are particularly useful for synthesizing aliphatic polyesters, such as polyethylene terephthalate, from dicarboxylic acids and aliphatic glycols. The present invention more specifically discloses a process for the synthesis of an aliphatic polyester comprising polymerizing at least one dicarboxylic acid with at least one aliphatic glycol in the presence of (1) at least one phosphorus containing compound which contains at least one trivalent or pentavalent phosphorus atom which is bonded directly to at least one phenyl group, (2) an acid accepter, and (3) at least one halogenated organic compound. It is preferred to utilize a polymeric agent having bound acid acceptor groups as the acid acceptor in the process of the present invention.

11 Claims, No Drawings

LOW TEMPERATURE SYNTHESIS OF CONDENSATION POLYMERS

This is a Divisional of application Ser. No. 07/180,924, filed on Apr. 11, 1988, of Naoya Ogata for LOW TEMPERATURE SYNTHESIS OF CONDENSATION POLYMERS which is a Divisional application of application Ser. No. 07/011,464, filed on Feb. 5, 1987 (now issued as U.S. Pat. No. 4,804,730).

BACKGROUND OF THE INVENTION

High molecular weight condensation polymers can be prepared by utilizing conventional polymerization techniques at elevated temperatures. For example, nylon (66) can be prepared by polycondensing (polymerizing) hexamethylene diamine with adipic acid at a temperature of about 280° C. and polybisphenol A carbonate can be prepared by polycondensing bisphenol A with diphenyl carbonate at a temperature of about 300° C. Condensation polymers of high molecular weight, such as polyesters, polyureas, and polyamides, are generally prepared at temperatures in excess of 200° C. The utilization of high temperatures in such synthesis techniques is, of course, an energy intensive process.

SUMMARY OF THE INVENTION

The subject invention specifically relates to a technique which can be utilized in the preparation of aliphatic polyesters, such as polyethylene terephthalate (PET). This process for preparing aliphatic polyesters utilizes a catalyst system which is comprised of (1) a phosphorus containing compound which contain at least one phosphorus atom which is bonded directly to at least one phenyl group, such as triphenylphosphine, triphenylphosphine oxide or triphenylphosphine sulfide, (2) an acid acceptor, such as pyridine, 2,2'-dipyridine disulfide, or poly-(4-vinylpyridine), and (3) at least one halogenated organic compound. A halogenated phosphorus containing compound, such as triphenylphosphine dichloride, can be used to serve the dual purpose of providing both the phosphorus containing compound component and the halogenated organic compound component of the catalyst system. The subject invention specifically reveals a process for the synthesis of an aliphatic polyester comprising polymerizing at least one dicarboxylic acid monomer with at least one aliphatic glycol monomer in the presence of (1) at least one phosphorus containing compound which contains at least one trivalent or pentavalent phosphorus atom which is bonded directly to at least one phenyl group, (2) an acid acceptor, and (3) at least one halogenated organic compound.

This invention also discloses a process for the synthesis of an aliphatic polyester comprising polymerizing at least one dicarboxylic acid monomer with at least one aliphatic glycol monomer in the presence of (1) at least one silicon-phosphorus compound which contains at least one divalent oxygen atom which is bonded directly to a tetravalent silicon atom and a trivalent or pentavalent phosphorus atom; (2) an acid acceptor; and (3) a halogenated organic compound.

The present invention also relates to an improved condensation catalyst system, the use of which results in higher monomer conversions and polymers which have higher molecular weights. These condensation catalyst systems are of particular value in the synthesis of aliphatic polyesters which are prepared by polymerizing dicarboxylic acids with aliphatic glycols. These catalyst systems contain a polymeric agent having bound acid acceptor groups.

The present invention specifically reveals a catalyst system which is particularly useful in synthesizing condensation polymers which is comprised of (1) at least one polymeric agent having bound acid acceptor groups, (2) at least one halogenated organic compound, and (3) at least one phosphorus containing compound selected from the group consisting of (a) triphenylphosphine, (b) triphenylphosphine oxide, (c) triphenylphosphine sulfide, (d) compounds with the structural formula $(C_6H_5)_3P=N-R$, wherein R is a hydrogen atom or an alkyl group containing from 1 to 10 carbon atoms, and (e) compounds with the structural formula $(C_6H_5)PR^1R^2$ wherein $R^1$ and $R^2$ can be the same or different, wherein $R^1$ is selected from the group consisting of alkyl groups containing from 1 to 10 carbon atoms and phenyl groups, and wherein $R^2$ is an alkyl group containing from 1 to 10 carbon atoms.

The subject invention also discloses a catalyst system which is particularly useful in synthesizing condensation polymers which is comprised of (1) at least one polymeric agent having bound acid acceptor groups and (2) at least one triphenylphosphine dihalide.

It is highly desirable to utilize a catalyst system which contains polymeric agents having both pendant diphenylphosphine groups and pendant acid acceptor groups. The present invention discloses such a catalyst system which is particularly useful in synthesizing condensation polymers which is comprised of (1) at least one polymeric agent having pendant diphenylphosphine groups and a bound acid acceptor group and (2) at least one halogenated organic compound.

DETAILED DESCRIPTION OF THE INVENTION

There are numerous benefits that can be realized by utilizing the condensation catalysts of the present invention. Since low temperatures are utilized thermal degradation of the polymer being synthesized can be virtually eliminated. Such low temperature techniques also avoid many side reactions which occur at higher temperatures. The low temperature polymerization techniques of the present invention also make possible the synthesis of new polymers, for instance, polymers which contain thermally unstable moieties. Accordingly, crosslinkable polyesters and polyamides can be prepared which contain unstable groups such as aldehydes and thiols. It should also be possible to prepare crosslinkable polymers which contain double or triple bonds using the catalyst systems disclosed herein. By utilizing such low temperature synthesis techniques, substantial energy savings are, of course, also realized.

The catalyst systems of the present invention are comprised of three components. These components include (1) at least one phosphorus containing compound wherein the phosphorus atom therein is bonded directly to at least one phenyl group, (2) an acid acceptor, and (3) at least one halogenated organic compound.' Catalyst systems which are comprised of (1) at least one silicon-phosphorus compound which contains at least one divalent oxygen atom which is bonded directly to a tetravalent silicon atom and a trivalent or pentavalent phosphorus atom, (2) an acid acceptor, and (3) a halogenated organic compound can also be utilized in the synthesis of aliphatic polyesters. In such catalyst systems, it is particularly preferred for the acid acceptor to be in the form of a polymeric agent having bound acid acceptor groups.

The polymeric agents containing bound acid acceptor groups which can be used in the catalyst systems of this invention contain bound acid acceptors which have a pKa of at least 5. The acid acceptors which are bound in such polymeric agents are typically organic bases. In most cases the bound organic bases in such polymers will have a pKa within the range of 5 to 12. The polymeric acid acceptors of this invention will commonly contain pendant acid acceptor groups. Poly(4-vinylpyridine) is an example of such a polymeric acid acceptor. Poly(4-vinylpyridine) can be represented by the structural formula:

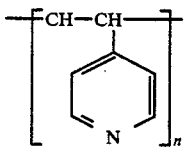

wherein n represents an integer. Polymers which contain pendant pyrrolyl, imidazolyl, pyrazolyl, pyridyl, pyrazinyl, pyrimidinyl, pyridazinyl, indolizinyl, isoindolyl, cinnolinyl, pteridinyl, carbazolyl, phenanthridinyl, acridinyl, or phenanthrolinyl groups are some representative examples of polymeric agents having pendant acid acceptor groups. The polymeric backbone to which such acid acceptor groups are bonded is not of great importance. In fact, the acid acceptor groups can be bonded onto either inorganic or polymeric organic substances. For instance, inorganic glasses which have such acid acceptor groups bonded to them work well in such catalyst systems. It is often convenient to prepare polymeric acid acceptors by simply polymerizing vinyl group containing organic acid acceptors. For instance, polymeric acid acceptors which are suitable for use in the catalyst systems of this invention can be prepared by polymerizing 2-vinylimidazole, 4-vinylimidazole, or 5-vinylimidazole. Poly(4-vinylimidazole) has the structural formula:

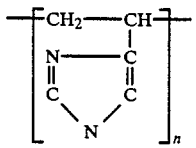

wherein n represents an integer. It is also possible to build acid acceptor groups directly into polymer chains. For instance, acid acceptor groups having the structural formula:

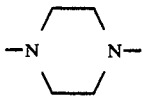

can be built into polymeric agents in order to make them suitable acid acceptors for utilization in the practice of this invention.

Polymeric agents which contain both pendant phenylphosphine groups and bound acid acceptor groups can also be utilized in the catalyst systems of this invention. For instance, such a polymeric agent can be prepared by polymerizing vinyldiphenylphosphine and 4-vinylpyridine. Such a polymeric copolymer has the structural formula:

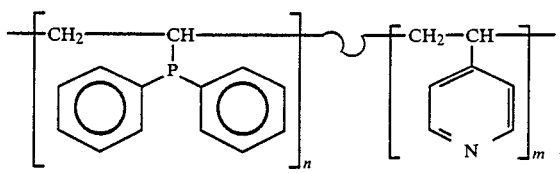

wherein n and m represent integers and wherein ⌇ indicates that the distribution of repeat units can be random. Such polymeric agents which contain both pendant diphenylphosphine groups and bound acid acceptor groups are highly desirable for utilization in the practice of the present invention because they greatly simplify the recovery of the acid acceptor and the phosphorus containing component of the catalyst system. It is, of course, also possible to use a polymeric agent having a pendant diphenylphosphine groups in conjunction with a second polymeric agent which contains bound acid acceptor groups.

Non-polymeric phosphorus containing compounds can also be used in the catalyst systems of this invention. For instance, triphenylphosphine, triphenylphosphine oxide and triphenylphosphine sulfide can be used as the phosphorus containing compound component in the catalyst systems of this invention. It is comtemplated that alkylated and halogenated phenyl groups can also be utilized in such compositions. Compounds having the structural formula $(C_6H_5)PR^1R^2$ wherein $R^1$ and $R^2$ can be the same or different, wherein $R^1$ is selected from the group consisting of alkyl groups containing from 1 to 10 carbon atoms and phenyl groups, and wherein $R^2$ is an alkyl group containing from 1 to 10 carbon atoms, can also be utilized as the phosphorus containing component in the catalyst systems of this invention. It is also possible to utilize compounds having the structural formula $(C_6H_5)_3P=N-R$, wherein R is a hydrogen atom or an alkyl group containing from 1 to 10 carbon atoms, in the catalyst systems of this invention as the phosphorus containing compound component.

It is also possible to utilize compounds which contain both silicon and phosphorus as the phosphorus containing compound component. Such silicon-phosphorus compounds contain at least one divalent oxygen atom which is bonded directly to a tetravalent silicon atom and to a trivalent of pentavalent phosphorus atom. Such silicon-phosphorus compounds have the general structural formula:

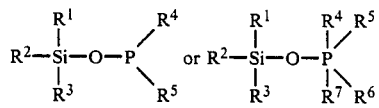

wherein $R^1$, $R^2$, $R^3$, $R^4$, $R^5$, $R^6$ and $R^7$ can be virtually any type of chemical moiety. For instance, $R^1$, $R^2$, $R^3$, $R^4$, $R^5$, $R^6$, and $R^7$ can be alkyl groups which contain from 1 to 20 carbon atoms, aryl groups which contain from 1 to 20 carbon atoms, alkylaryl groups which contain from 1 to 20 carbon atoms, hydrogen atoms, organomethallic groups, or inorganic moieties. Additionally, $R^4$, $R^5$, $R^6$ and $R^7$ can be halogen atoms with the proviso that no more than 2 of such groups are halogen atoms. Chlorine, bromine, and iodine are particularly useful halogens in such silicon-phosphorus compounds. These groups can have a cyclic structure. In fact, these moieties can be multiply bonded to the silicon and/or phosphorus atoms. The number of possible compositions and structures for such silicon-phosphorus compounds is virtually unlimited.

Silicon-phosphorus compounds having the structural formula:

P(OSiR$_3$)$_3$ wherein R is an alkyl group containing from 1 to 20 carbon atoms are very effective in the catalyst systems of the present invention. In most cases the alkyl groups in such compounds will contain from 1 to 8 carbon atoms. For instance, tris(trimethyl silil) phosphite has been used in the catalyst systems of this invention with great success. R can also represent aryl groups or alkylaryl groups which contain from 1 to 20 carbon atoms. Silicon-phosphorus compounds having the structural formula:

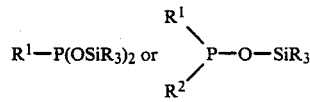

wherein R, R$^1$ and R$^2$ can be the same or different and are selected from the group consisting of alkyl groups containing from 1 to 20 carbon atoms, aryl groups containing from 1 to 20 carbon atoms, and akylaryl groups containing from 1 to 20 carbon atoms, are also useful in the catalyst systems of the present invention. In most cases, R, R$^1$, and R$^2$ will contain from 1 to 8 carbon atoms.

Silicon-phosphorus compounds having the structural formula:

O=P(OSiR$_3$)$_3$ wherein R is selected from the group consisting of alkyl groups, alkylaryl groups and aryl groups containing from 1 to 20 carbon atoms can also be used in such catalyst systems. Similarly, silicon-phosphorus compounds having the structural formula:

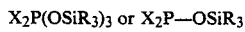
X$_2$P(OSiR$_3$)$_3$ or X$_2$P—OSiR$_3$ wherein X is a halogen atom and wherein R is selected from the group consisting of alkyl groups, alkylaryl groups and aryl groups containing from 1 to 20 carbon atoms, can also be used.

A polymeric silicon-phosphorus composition that can be utilized has the structural formula:

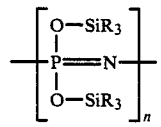

wherein R is an alkyl group, an aryl group or an alkylaryl group and wherein n is an integer. In most cases R will be an alkyl group containing from 1 to 8 carbon atoms or a phenol group. Generally, n will be an integer from about 10 to about 1000. Another polymeric silicon-phosphorus composition that can be used has the structural formula:

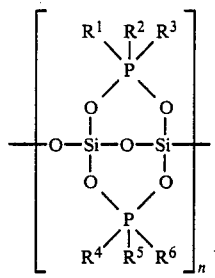

wherein n is an integer and wherein R$^1$, R$^2$, R$^3$, R$^4$, R$^5$, and R$^6$ can be the same or different and are selected from alkyl groups, alkylaryl groups and aryl groups which contain from 1 to 20 carbon atoms. In most cases, n will be an integer from about 10 to about 1000.

The halogenated organic compounds which are utilized as a component of the catalyst system generally contain at least one carbon atom which has at least two halogen atoms bonded directly to it. Preferably such halogenated organic compounds will contain one or more carbon atoms which have at least three halogen atoms bonded directly to them, such as trichloromethane. Halogenated organic compounds which have a carbon atom with four halogen atoms bonded directly to it, such as carbon tetracloride and carbon tetrabromide, are highly preferred for use in the catalyst systems of the present invention. Silicon-phosphorus compounds which contain halogen atoms can serve the dual purpose of providing both the silicon-phosphorus compound component and the halogenated organic compound component of the catalyst system. Triphenylphosphine dihalides, such as triphenylphosphine dichloride or triphenylphosphine dibromide, also serve the dual purpose of providing both the phosphorus containing compound component and the halogenated organic compound component of such catalyst systems.

The acid acceptor and the phosphorus containing compound can be employed in amounts which result in there being approximately equal molar amounts of acid acceptor groups, phosphorus atoms (in the phosphorus containing compound component), and monomers in the polymerization system.

It has been determined that a molar ratio of phosphorus atoms to monomer of about 1.2:1 is optimal. In most cases a molar ratio of phosphorus atoms to monomer which is within the range of 0.8:1 to 2:1 will be used. It is preferred for the molar ratio of phosphorus atoms to monomer to be within the range of 1.0:1 to 1.5:1. The molar ratio of acid acceptor groups to monomer will generally be at least 1:1. Large excesses of the acid acceptor wherein the ratio of acid acceptor groups to monomer is much greater than 1:1 can be used without creating problems. For example, an organic base, such as pyridine, can be used as the solvent in the reaction medium. Ratios of acid acceptor groups to monomer of less than 1:1 can be used but conversions will be reduced. In most cases at least one mole of reactive halogen atoms (in the halogenated organic compound) will be employed per mole of monomer. For example, at least 1 mole of tetrachloromethane (carbon tetrachloride) or at least ½ mole of hexachloroethane could be employed per mole of monomer. A ratio of reactive halogen atoms to monomer of less than 1:1 will reduce conversions in the polymerization but large ratios of acid acceptor groups to monomer which are greatly in excess of 1:1 are not detrimental. Typically the polymerization will be conducted in an inert organic solvent. Any inert organic solvent which provides sufficient solubility can be utilized. Aromatic organic solvents, such as pyridine or alkyl substituted pyridines (picoline or lutidine) will typically be employed because they normally provide good solubility. Dimethylformamide is an example of an aliphatic liquid that provides good solubility.

The reaction mediums utilized in the polymerizations of this invention are comprised of the inert organic solvent, the catalyst system and the monomers being polymerized. Such reaction mixtures normally contain from about 0.05 to 1 moles of monomer per liter of solution. However, it is permissible to utilize the maximum amount of monomer which is soluble in the particular organic solvent being used. More typically such reaction mixtures will contain from about 0.1 to about 0.5 moles of monomer per liter of solution.

The polymerizations of this invention will normally be carried out at a temperature between about 0° C. and about 150° C. Preferably such polymerizations will be conducted at a temperature of from 50° C. to 80° C.

Catalyst systems which utilize a polymeric agent having pendant diphenyl phosphine dihalide groups in conjunction with an acid acceptor can also be used. Such pendant diphenylphosphine dihalide groups can be represented by the structural formula:

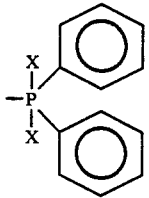

wherein X represents a halide atom. The polymeric backbone to which such diphenylphosphine dihalide groups are bonded is not of great importance. In fact, the diphenylphosphine dihalide groups can be bonded to either inorganic or polymeric organic substances. For instance, inorganic glasses which have such diphenylphosphine dihalide groups bonded to them work well in such catalyst systems. Organic polymers, such as polystyrene can also be used to support pendant diphenylphosphine dihalide groups. Normally the diphenylphosphine dihalide will be diphenylphosphine dichloride. The triphenylphosphine dihalide transforms into a triphenylphosphine oxide after the polycondensation and the triphenylphosphine oxide can be converted back to a triphenylphosphine dihalide by treatment with either an oxalyl halide

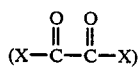

or a carbonyl dihalide

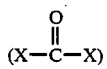

at a temperature from 0° C. to 50° C.

The polyamides made in accordance with the present invention are prepared by reacting one or more diamines with one or more dicarboxylic acids. The polyesters made in accordance with the present invention are prepared by reacting one or more diols with one or more dicarboxylic acids.

The dicarboxylic acids utilized in the preparation of such polyesters and polyamides are normally alkyl dicarboxylic acids which contain from 4 to 36 carbon atoms, aryl dicarboxylic acids which contain from 8 to 20 carbon atoms, and alkyl substituted aryl dicarboxylic acids which contain from 9 to 22 carbon atoms. The preferred alkyl dicarboxylic acids will contain from 4 to 12 carbon atoms. Some representative examples of such alkyl dicarboxylic acids include glutaric acid, adipic acid, pimelic acid, and the like. The preferred aryl dicarboxylic acids contain from 8 to 16 carbon atoms. Some representative examples of aryl dicarboxylic acids are terephthalic acid, isophthalic acid, and orthophthalic acid. The preferred alkyl substituted aryl dicarboxylic acids contain form 9 to 16 carbon atoms.

The diamine component utilized in the preparation of polyamides is normally a diamine that contains from 2 to 12 carbon atoms. Preferred diamines normally contain from 2 to 8 carbon atoms with preferred diamines containing from 4 to 8 carbon atoms. Some representative examples of diamines that can be utilized in the synthesis of polyamides include ethylene diamine, hexamethylenediamine, bis(4-amino-cyclohexyl)-methane, o-phenyldiamine, m-phenylenediamine, p-phenylenediamine, 1,2-diamino-3,5-dichlorobenzene, 1,3-diamino-2,5-dichlorobenzene, 1,2-diamino-4-methylbenzene, 1,4-diamino-2-isopropylbenezene, 1,3-diaminopropane, 1,4-diaminobutane, and the like.

The diol component utilized in making aromatic polyesters in accordance with the present invention are aromatic diols which normally contain from 6 to 20 carbon atoms. Bisphenol A is a good example of an aromatic diol that can be used. Some other aromatic diols which can be used include 1,2-dihydroxybenzene (catechol), 1,3-dihydroxybenzene (resorcinol), 1,4-dihydrooxybenzene (hydroquinone), 1,2-dihydroxy-3,5-dimethylbenzene, 1,2-dihydroxy-4,5-dimethylbenzene, 1,4-dihydroxy-2,3-dimethylbenzene, 2,4-dihydroxy-1-ethylbenzene, 2,4-dihydroxy-1-hexylbenzene, 1,4-dihydroxy-2-iodobenzene, 2,4-dihydroxy-1-isobutylbenzene, 1,2-dihydroxy-4-isopropylbenzene, 1,4-dihydroxy-2-isopropylbenzene, 1,4-dihydroxy-2-isopropyl-5-methylbenzene, 1,3-diydroxy-2-methylbenzene, 2,4-dihydroxy-1-(3-methyl-butyl)benzene, 2,4-dihydroxy-1-(4-methylpentyl)benzene, 1,3-dihydroxy-4-pentylbenzene, 1,3-dihydroxy-5-pentylbenzene, 1,4-dihydroxy-2,3,5,6-tetrabromobenzene, 1,3-dihydroxy-2,4,5,6-tetrachlorobenzene, 1,4-dihydroxy-2,3,5,6-tetramethylbenzene, and the like.

The diol component utilized in making aliphatic polyesters in accordance with this invention are normally diols which contain from 2 to 8 carbon atoms. The diols which are most commonly used contain from 2 to 6 carbon atoms and have the structural formula HO—A—OH, wherein A is an alkylene group. Ethylene glycol, 1,4-butane diol and 1,6-hexane diol are the most commonly used diols in making such polyesters.

The polyesters and polyamides which are prepared utilizing the catalyst system of the present invention can be made in a manner so as to induce branching. Such branching is normally attained by utilizing a branching agent in the synthesis of the polyester or polyamide. Such branching agents normally contain three or more functional groups and preferably contain three or four functional groups. The reactive groups may be carboxyl or aliphatic hydroxyl. The branching agent can contain both types of groups. Examples of acidic branching agents include trimesic acid, trimellitic acid, pryomellitic acid, butane tetracarboxylic acid, naphthalene tricarboxylic acids, cyclohexane-1,3,5-tricarboxylic acids, and the like. Some representative examples of hydroxyl branching agents (polyols) include glycerin, trimethylol propane, pentaerythritol, dipenterythritol, 1,2,6-hexane triol, and 1,3,5-trimethylol benzene. Generally, from 0 to 3 percent of a polyol containing from 3 to 12 carbon atoms will be used as the branching agent (based upon the total diol component).

This invention is illustrated by the following examples which are merely for the purpose of illustration and are not to be regarded as limiting the scope of the invention or the manner in which it can be practiced. Unless specifically indicated otherwise, parts and percentages are given by weight.

EXAMPLES 1-12

Polyethylene terephthalate was synthesized by polymerizing terephthalic acid and ethylene glycol in the presence of triphenylphosphine dichloride and various acid acceptors. In this series of experiments various acid acceptors were evaluated in two solvents (monochlorobenzene and tetrachloroethane). These polymerizations were carried out by adding 10 ml of the solvents specified in Table I and about 6 grams (0.022 moles) of triphenylphosphine oxide to a 100 ml flask followed by the addition of 10 additional milliliters of solvent which contained about 1.84 cubic centimeters (0.022 moles) of oxalic chloride to form triphenylphosphine dichloride. After the evolution of hydrocloric gas, about 1.66 grams of terephthalic acid was added at refluxing temperature with the solution subsequently being cooled to room temperature. About 0.56 cubic centimeters (0.01 moles) of ethylene glycol was added followed by the addition of one of the acid acceptors specified in Table I while the solution was vigorously being stirred. The solution was heated under reflux conditions and after a reaction time of 4 hours, it was poured into excess methanol and the resulting polymers were filtered off followed by washing with water and methanol. The polymers produced were subsequently dried under vacuum.

Table I shows the solvent in which the polymerization was conducted, the polymerization temperature, the acid acceptor utilized, the amount of acid acceptor utilized, the polymer yield, and the intrinsic viscosity of the polymer produced.

TABLE I

| Ex. | Solvent | Pzm. Temp. | Acid Acceptor (mol/liter) | Polymer Yield | $\eta_{sp/c}$ |
|---|---|---|---|---|---|
| 1 | CB | 130 | Pyridine,0.04 | 66% | 0.13 |
| 2 | TCE | 146 | Pyridine,0.04 | 82% | 0.14 |
| 3 | CB | 130 | 4,4'-dipyridine,0.02 | 45% | 0.12 |
| 4 | TCE | 146 | 4,4'-dipyridine,0.02 | 45% | 0.10 |
| 5 | CB | 130 | 2,2'-dipyridine,0.02 | 75% | 0.10 |
| 6 | TCE | 146 | 2,2'-dipyridine,0.02 | 64% | 0.09 |
| 7 | CB | 130 | 2,2'-dipyridine disulfide,0.02 | 100% | 0.25 |
| 8 | TCE | 146 | 2,2'-dipyridine disulfide,0.02 | 100% | 0.30 |
| 9 | CB | 130 | Poly(4-vinylpyridine),0.04 | 90% | 0.25 |
| 10 | TCE | 146 | Poly(4-vinylpyridine),0.04 | 95% | 0.30 |
| 11 | CB | 130 | Triethylamine,0.04 | 51% | 0.14 |
| 12 | TCE | 146 | Triethylamine,0.04 | 83% | 0.11 |

CB = monochlorobenzene
TCE = tetrachloroethane

This series of experiments clearly shows that PET can be synthesized using the catalyst systems of this invention. In fact, the catalyst systems used resulted in excellent polymer yields and respectable intrinsic viscosities. The utilization of poly(4-vinylpyridine) resulted in particularly good yields and in the production of a high molecular weight polymer (the high intrinsic viscosities attained are indicative of high molecular weights). The utilization of 2,2'-dipyridine disulfide as an acid acceptor resulted in particularly good polymer yields and respectable intrinsic viscosities.

EXAMPLE 13

A Grignard reagent was made by reacting 4-chlorostyrene with the turnings of metallic magnesium in a dry ether solvent. The Grignard reagent produced was then reacted with diphenylphosphine chloride so as to produce p-styryl diphenyl phosphine. The reactions used can be depicted by the following reactions:

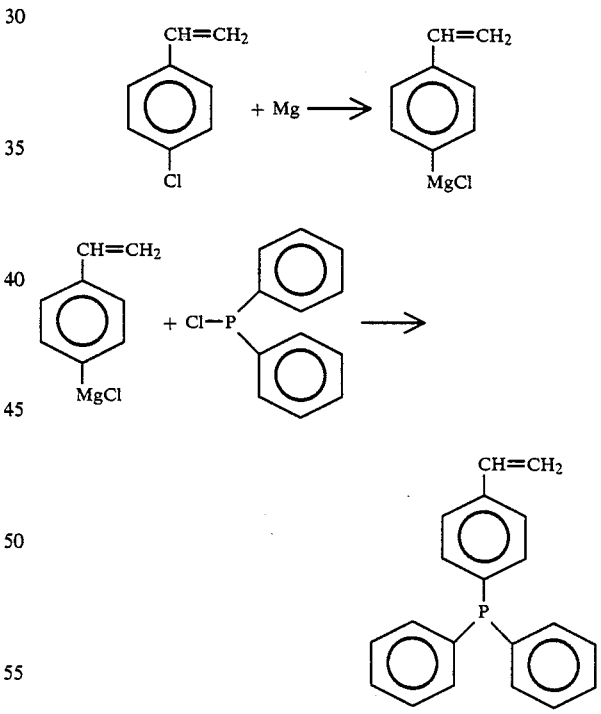

The p-styryl diphenyl phosphine produced was synthesized with a yield of 65% being attained.

EXAMPLES 14-19

Copolymers containing pendant diphenylphosphine groups and bound acid acceptor groups were prepared by polymerizing p-styryl diphenyl phosphine and 4-vinyl pyridine in conventional free radical polymerizations. A series of p-styryl diphenyl phosphine/4-vinyl pyridine copolymers were prepared utilizing various ratios of p-styryl diphenyl phosphine monomer and 4-vinyl pyridine monomer in the polymerization mediums used. The molar ratio of p-styryl diphenyl phosphine monomer to 4-vinyl pyridine monomer used in each of the examples in this series of experiments is shown in Table II.

The p-styryl diphenyl phosphine used in this series of experiments was prepared by utilizing the process specified in Example 13. All of the polymerizations were conducted in benzene with 2,2'-azobisisobutyronitrile (AIBN) being used as the initiator. Table II shows the molar ratio of p-styryl diphenyl phosphine to 4-vinyl pyridine, the polymer yields, and intrinsic viscosities for each of the copolymers produced. The compositions of the copolymers synthesized were determined by elementary analysis.

TABLE II

Copolymerization of p-styryl diphenyl phosphate with 4-vinyl pyridine

| Example | Molar Ratio of SDP to VP in Polymerization Medium | Molar Ratio of SDP to VP in Copolymers | Yield | $\eta_{sp/c}$ |
|---|---|---|---|---|
| 14 | 9:1 | .87:.13 | 26 | .26 |
| 15 | 8:2 | .77:.23 | 21 | .23 |
| 16 | 6:4 | .61:.39 | 19 | .19 |
| 17 | 4:6 | .41:.59 | 4 | .27 |
| 18 | 2:8 | .21:.79 | 21 | .31 |
| 19 | 1:9 | .14:.86 | 24 | .26 |

SDP = p-styryl diphenyl phosphine
VP = 4-vinyl pyridine

EXAMPLE 20

A copolymer of p-styryl diphenyl phosphine and 4-vinyl pyridine having a molar ratio of p-styryl diphenyl phosphine to 4-vinyl pyridine of 0.15:0.85 was used in conjunction with hexachloroethane as the catalyst system for synthesizing a copolyester of terephthalic acid, isophthalic acid, and bisphenol A. In this experiment 4.15 g (0.025 moles) of terephthalic acid, 4.15 g (0.025 moles) of isophthalic acid, and 63.5 g of the p-styryl diphenyl phosphine/4-vinyl pyridine copolymer (in powdered form) were added to 100 ml of monochlorobenzene and the mixture formed was vigorously stirring. Subsequently, 11.4 g (0.05 moles) of bisphenol A was added to the mixture followed by the addition of 14.46 g of hexacloroethane. The molar ratio of the p-styryl diphenyl phosphine/4-vinyl pyridine copolymer to hexachloroethane was 1.2:1 and the concentration of monomers in the solution was 0.5 moles/liter. The polymerization reaction was carried out at room temperature for 4 hours followed by refluxing at 130° C. for one hour.

After the polymerization was completed, the polymerization solution was poured into methanol and the polyester copolymer produced was collected by filtration and dried. A polymer yield of 31% was attained and the copolyester produced had a specific viscosity of 0.35. This example clearly shows that catalyst systems which are comprised of (1) polymeric agents having pendant diphenylphosphine groups and pendant acid acceptor groups and (2) halogenated organic compounds can be used for synthesizing polyesters.

EXAMPLE 21

The procedure specified in Example 20 was also used in this experiment except that 8.3 g (0.05 moles) of isiphthalic acid was used as the dicarboxylic acid component of the monomer charge (no terephthalic acid was included). In this experiment a polymer yield of 20% was attained and the polyester synthesized had a specific viscosity of 0.15.

EXAMPLE 22

The procedure used in Example 21 was repeated in this experiment except that a copolymer of p-styryl diphenyl phosphine and 4-vinyl pyridine having a molar ratio of p-styryl diphenyl phosphine to 4-vinyl pyridine of 0.77:0.23 made by the procedure specified in Example 15 was used. In this experiment the polymer yield was 30% and the polyester produced had a specific viscosity of 0.40.

EXAMPLE 23

The procedure specified in Example 20 was used in this experiment except that tetramethylurea was used as the solvent in place of monochlorobenzene. The yield attained was 35% and the polymer produced had a specific viscosity of 0.40.

EXAMPLE 24

The procedure specified in Example 22 was used in this experiment except that tetramethylurea was used as the solvent in place of monochlorobenzene. In this experiment the polymer yield was 45% and the polyester produced had a specific viscosity of 0.35.

EXAMPLE 25

In this experiment the catalyst system described in Example 20 was used to polymerize p-aminobenzoic acid using monochlorobenzene as the solvent. The polymer yield attained was 100% and the polyaminobenzoic acid produced had a specific viscosity of 0.35. This experiment shows that catalyst systems which utilize polymeric agents having pendant diphenylphosphine groups and pendant acid acceptor groups in conjunction with halogenated organic compounds can be used to synthesize polyamides with excellent yields being attained.

Variations in the present invention are possible in light of the descriptions of it provided herein. It is, therefore, to be understood that changes can be made in the particular embodiments described which will be within the full intended scope of the invention as defined by the following appended claims.

What is claimed is:

1. A catalyst system which is particularly useful in synthesizing condensation polymers which is comprised of (1) at least one polymeric agent having bound acid acceptor groups, (2) at least one halogenated organic compound, and (3) at least one phosphorus containing compound selected from the group consisting of (a) triphenylphoshine, (b) triphenylphosphine oxide, (c) triphenylphosphine sulfide, (d) compounds with the structural formula $(C_6H_5)_3P=N-R$, wherein R is a hydrogen atom or an alkyl group containing from 1 to 10 carbon atoms, and (e) compounds with the structural formula $(C_6H_5)PR^1R^2$ wherein $R^1$ and $R^2$ can be the same or different, wherein $R^1$ is selected from the group consisting of alkyl groups containing from 1 to 10 carbon atoms and phenyl groups, wherein $R^2$ is an alkyl group containing from 1 to 10 carbon atoms.

2. A catalyst system as specified in claim 1 wherein the halogenated organic compound contains at least one carbon atom which has at least 2 halogen atoms bonded directly to it.

3. A catalyst system as specified in claim 1 wherein the halogenated organic compound contains at least one carbon atom which has at least 3 halogen atoms bonded directly to it.

4. A catalyst system as specified in claim 1 wherein the acid acceptor has a pKa of at least 5.

5. A catalyst system as specified in claim 1 wherein the acid acceptor has a pKa which is within the range of 5 to 12.

6. A catalyst system as specified in claim 1 wherein the halogenated organic compound is selected from the group consisting of carbon tetrachloride and carbon tetrabromide.

7. A catalyst system as specified in claim 1 wherein the phosphorus containing compound is triphenylphosphine oxide.

8. A catalyst system as specified in claim 1 wherein the phosphorus containing compound is triphenylphosphine.

9. A catalyst system as specified in claim 1 wherein the polymeric agent having bound acid acceptor groups is poly(40vinylpyridine).

10. A catalyst system as specified in claim 1 wherein the bound acid acceptor group is an organic base which has a pKa which is within the range of 5 to 12 and wherein the halogenated organic compound contains at least one carbon atom which has at least 3 halogen atoms bonded directly to it.

11. A catalyst system as specified in claim 10 wherein the polymeric agent having bound acid acceptor groups is poly(4-vinylpyridine).

* * * * *